US008867373B2

(12) United States Patent
Dimou et al.

(10) Patent No.: US 8,867,373 B2
(45) Date of Patent: Oct. 21, 2014

(54) APPARATUS AND METHOD FOR DECLARING RADIO LINK FAILURE (RLF)

(75) Inventors: Konstantinos Dimou, Stockholm (SE); Stephen Grant, Pleasanton, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 94 days.

(21) Appl. No.: 13/603,961

(22) Filed: Sep. 5, 2012

(65) Prior Publication Data

US 2014/0064103 A1 Mar. 6, 2014

(51) Int. Cl.
*G01R 31/08* (2006.01)
(52) U.S. Cl.
USPC ............................................................ 370/242
(58) Field of Classification Search
CPC ............ H04W 24/00; H04W 36/0055; H04W 76/028
USPC ........................................................ 370/242
See application file for complete search history.

(56) References Cited

U.S. PATENT DOCUMENTS

| | | | |
|---|---|---|---|
| 2006/0183429 A1* | 8/2006 | Anderson | 455/67.13 |
| 2009/0161571 A1* | 6/2009 | Terry et al. | 370/252 |
| 2010/0124172 A1* | 5/2010 | Tenny et al. | 370/242 |
| 2010/0124203 A1* | 5/2010 | Tenny et al. | 370/331 |
| 2010/0234027 A1* | 9/2010 | Han et al. | 455/436 |
| 2011/0207485 A1* | 8/2011 | Dimou et al. | 455/507 |
| 2011/0242965 A1 | 10/2011 | Strzyz et al. | |
| 2011/0269462 A1* | 11/2011 | Sagfors et al. | 455/436 |
| 2011/0275394 A1* | 11/2011 | Song et al. | 455/509 |
| 2012/0002554 A1* | 1/2012 | Ishii et al. | 370/242 |
| 2012/0039167 A1* | 2/2012 | Swaminathan et al. | 370/225 |
| 2012/0276936 A1* | 11/2012 | Ahn et al. | 455/501 |
| 2012/0281548 A1* | 11/2012 | Lin et al. | 370/242 |
| 2013/0010716 A1* | 1/2013 | Dinan | 370/329 |
| 2013/0021929 A1* | 1/2013 | Kim | 370/252 |
| 2013/0028201 A1* | 1/2013 | Koo et al. | 370/329 |
| 2013/0084910 A1* | 4/2013 | Suzuki et al. | 455/515 |
| 2013/0095818 A1* | 4/2013 | Levy et al. | 455/423 |
| 2013/0121167 A1* | 5/2013 | Wong et al. | 370/242 |
| 2013/0170343 A1* | 7/2013 | Ye et al. | 370/230 |
| 2013/0196664 A1* | 8/2013 | Yiu et al. | 455/436 |
| 2013/0242716 A1* | 9/2013 | Amerga et al. | 370/216 |
| 2013/0315075 A1* | 11/2013 | Tamura et al. | 370/242 |
| 2014/0024360 A1* | 1/2014 | Jung et al. | 455/418 |
| 2014/0057634 A1* | 2/2014 | Chang et al. | 455/437 |

OTHER PUBLICATIONS

International Search Report and Written Opinion issued in International Application No. PCT/IB2013/058266, 14 pages (Feb. 24, 2014).

(Continued)

*Primary Examiner* — Asad Nawaz
*Assistant Examiner* — Syed S Ali
(74) *Attorney, Agent, or Firm* — Rothwell, Figg, Ernst & Manbeck, P.C.

(57) ABSTRACT

According to one aspect, there is provided a method performed by a communication device for declaring RLF. In some embodiments, the method includes: (1) the communication device establishing a connection with a serving base station; (2) the communication device determining whether to relax a condition for declaring RLF; (3) the communication device using a first rule in declaring an RLF in response to determining that the communication device should not relax the condition; and (4) the communication device using a relaxed rule in declaring an RLF in response to determining that the communication device should relax the condition, wherein the relaxed rule is less stringent than the first rule.

16 Claims, 9 Drawing Sheets

(56) References Cited

OTHER PUBLICATIONS

Alcatel-Lucent et al., "Discussion on RLF parameter setting for improving mobility," Aug. 13, 2012, 3GPP TSG-RAN WG2, meeting #79, R2-123433, 4 pages.

Alcatel-Lucent et al., "RLM Considerations of Almost Blank Subframe," Aug. 17, 2010, 3GPP TSG RAN WG1, Meeting #62, R1-104413, 3 pages.

Samsung, "Cell Range Expansion Performance Evaluation," Oct. 5, 2010, TSG-RAN WG1, Meeting #62bis, 11 pages.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2 (Release 11)," Mobile Competence Centre, Sophia-Antipolis Cedex, France, vol. RAN WG2, No. V11.2.0, pp. 1-201 (Jun. 27, 2012).

"3$^{rd}$ Generation Partnership Project; Technical Specification Group Radio Access Network; Evolved Universal Terrestrial Radio Access (E-UTRA); Radio Resource Control (RRC); Protocol Specification (Release 11)," Mobile Competence Centre, Sophia-Antipolis Cedex, France, vol. RAN WG2, No. V11.0.0, pp. 1-302 (Jul. 2, 2012).

* cited by examiner

APPARATUS AND METHOD FOR DECLARING RADIO LINK FAILURE (RLF)

TECHNICAL FIELD

The present disclosure relates to wireless communications and in particular to radio link failure detection in a wireless communication system.

BACKGROUND

Long Term Evolution (LTE) is rapidly emerging as the world's most dominant 4G technology, taking mobile broadband to unprecedented performance levels. To meet expectations and predictions for even higher data rates and traffic capacity—beyond what is available in current LTE networks—a densified network 199 (see FIG. 1) is needed. In scenarios where users are highly clustered, using multiple, low-output power base stations (e.g., base stations 110, 120, and 130) to complement a macro base station 100 providing basic coverage is an attractive solution—as illustrated in FIG. 1. This strategy results in a heterogeneous network (HetNet) deployment with two base station layers. The principle can be extended to more than two layers.

Traditionally, a communication device (e.g., a mobile phone or other communication device) connects to the base station (a.k.a., "node") from which the downlink signal strength is the strongest. For example, in FIG. 1, cell 121 is the area in which the signal from the low-power node 120 (e.g., pico node) serving the cell is the strongest. Communication devices located in this cell (e.g., device 125) connect to the corresponding low-power node (i.e., node 121). In contrast, device 105 connects to node 100 as device 105 detects the strongest signal as coming from node 100.

Due to the difference in transmission power between pico nodes 110, 120, 130 and the overlying macro node 100, this strategy of having a communication device connect to the node associated with the highest power received signal does not necessarily result in the terminal connecting to the node to which it has the lowest path loss. It is, therefore, not the best node-selection strategy for achieving high uplink data rates. For example, it may be the case that the path loss from device 105 to node 120 is less than the path loss from device 105 to node 100.

The uptake of a low-power node can be expanded without increasing the output power of the node by adding an offset to the received downlink signal strength in the cell-selection process. That is, by introducing this offset, a device can be configured to connect to a low-power node even if the power of the received signal transmitted by the low-power node is less than the power of the received signal transmitted by the macro node. Increasing the uptake area of a node is sometimes referred to as range expansion. An example of range expansion is illustrated in FIG. 2. As shown by FIG. 2, in particular embodiments, range expansion may result in a device connecting to a low-power node while operating in an area (referred to herein as an "expansion zone") despite the fact that the power of the received signal transmitted by the macro node is greater than the power of the received signal transmitted by the low-power node in this area. In some embodiments, this expansion zone may represent a predetermined geographic area. In other embodiments, the expansion zone may represent a potentially time-varying area in which a particular condition related to the radio channel(s) used by the device is satisfied. For example, in particular embodiments, the expansion zone may represent the area in which the power of the received signal transmitted by the macro node does not exceed the power of the received signal transmitted by the lower-power node by more than a predetermined offset.

The advantages of range expansion include: enhanced uplink data rates; increased capacity—receiving downlink traffic from the low-power node even if the received signal strength from the macro is higher allows for the reuse of transmission resources across low-power nodes; and improved robustness—enlarging the coverage area of a low-power node can reduce its sensitivity to ideal placement in a traffic hotspot.

A heterogeneous deployment, with a modest range expansion somewhere in the region of 3-4 dB, is already possible in the first release of LTE, Rel-8. The $3^{rd}$ generation partnership project (3GPP) has recently discussed the applicability of range expansion with cell-selection offsets up to 9 dB. Such deployments are particularly problematic, as a terminal in the range-expansion zone (the striped area shown in FIG. 2) may experience very low downlink signal-to-interference ratio due to the significant difference in output power of the nodes. Specifically, downlink control signalling in the range expansion zone—which is essential for the low-power node to control transmission activity—poses a problem. Transmission of the data part is less challenging as Rel-8 supports methods for ensuring non-overlapping transmissions in the frequency domain from the macro and the low-power node using inter-cell interference coordination (ICIC).

One way to overcome the problem associated with downlink control signalling in the range expansion zone is to intelligently allocate resources. For example, by restricting macro node transmissions from using the same time and/or frequency resources as the low-power node, control signalling from the low-power node to the terminal can be protected.

Resource partitioning can be implemented in the frequency domain by using support for carrier aggregation (Rel-10) and can be implemented in the time domain, by relying on almost blank subframes (ABSs), a feature that will be fully supported in LTE Rel-11 (see FIG. 3).

Frequency-domain partitioning protects downlink control-signalling from the low-power node in the range-expansion zone by placing control signalling from the macro and low-power nodes on separate carriers.

Time-domain partitioning protects the downlink control signalling from the low-power node by reducing (or eliminating) macro transmission activity in certain subframes—which is illustrated in FIG. 3 and referred to as ABS. The low-power node is provided with data about the set of ABSs and can use this information when scheduling users who are in the range-expansion zone.

For backward compatibility, the macro node must transmit certain signals, most notably cell-specific reference signals (CRSs) and synchronization signals (PSSs/SSSs), in downlink subframes in the same way as in Rel-8. Thus, in some instances, the ABSs are, as a result, not completely blank—but they are almost blank. Terminals need to apply interference suppression to receive control signalling from the low-power node. Time-domain partitioning can thus be viewed as a terminal-centric approach to achieving excessive range expansion.

While resource partitioning reduces or solves some problems with introducing range expansion in an HetNet, other problems still exist. For example, measurement results and simulations have shown that communication devices connected to a low-power node while in the range expansion zone experience an increase in Radio Link Failures.

SUMMARY

Described herein are apparatuses and methods that aim to address the problem of increased Radio Link Failures (RLF).

In some embodiments, the methods aim to reduce the RLF rate within a node's expansion zone.

According to one aspect, there is provided a method performed by a communication device for declaring RLF. In some embodiments, the method includes: (1) the communication device establishing a connection with a serving base station; (2) the communication device determining whether to relax a condition for declaring RLF; (3) the communication device using a first rule in declaring RLF in response to determining that the communication device should not relax the condition; and (4) the communication device using a relaxed rule in declaring RLF in response to determining that the communication device should relax the condition, wherein the relaxed rule is less stringent than the first rule.

In some embodiments, the step of determining whether to relax a condition for declaring RLF comprises the communication device determining whether it is within an expansion zone of the serving base station. The step of determining whether the device is within an expansion zone of the serving base station may include the steps of: detecting a first reference signal transmitted from the serving base station; detecting a second reference signal transmitted from a neighboring base station; and determining whether the received power of the first reference signal is less than a value that is a function of the received power of the second reference signal. The second value may be equal to the received power of the second reference signal or it may be equal to the received power of the second reference signal plus an offset value.

In some embodiments, the step of determining whether to relax a condition for declaring RLF further comprises the communication device determining whether a base station neighboring the serving base station is configured to occasionally transmit almost blank subframes (ABS).

In some embodiments, the step of determining whether to relax a condition for declaring an RLF further comprises the communication device determining whether the communications network to which the device is connected is a heterogeneous network.

In some embodiments, a link failure is declared under the first rule if a first set of conditions is met, wherein one of the conditions in the first set of conditions is that the number of consecutive out-of-sync indications must exceed a first threshold value, a link failure is declared under the second rule if a second set of conditions is met, wherein one of the conditions in the second set of conditions is that the number of consecutive out-of-sync indications must exceed a second threshold value, and the second threshold value is greater than the first threshold value. The first threshold value may be equal to 1 and the second threshold value may be equal to or greater than 3.

In another aspect, there is provided a communication device that performs the above described method.

Other aspects, embodiments, and features are described below.

BRIEF DESCRIPTION OF DRAWINGS

Embodiments will now be described in more detail in relation to the accompanying drawings, in which.

DETAILED DESCRIPTION

Disclosed herein are methods and apparatuses that aim to address the problem of increased Radio Link Failures (RLF) caused by expanding a node's uptake. In some embodiments, the methods aim to reduce the RLF rate within the node's expansion zone.

Figure 1:
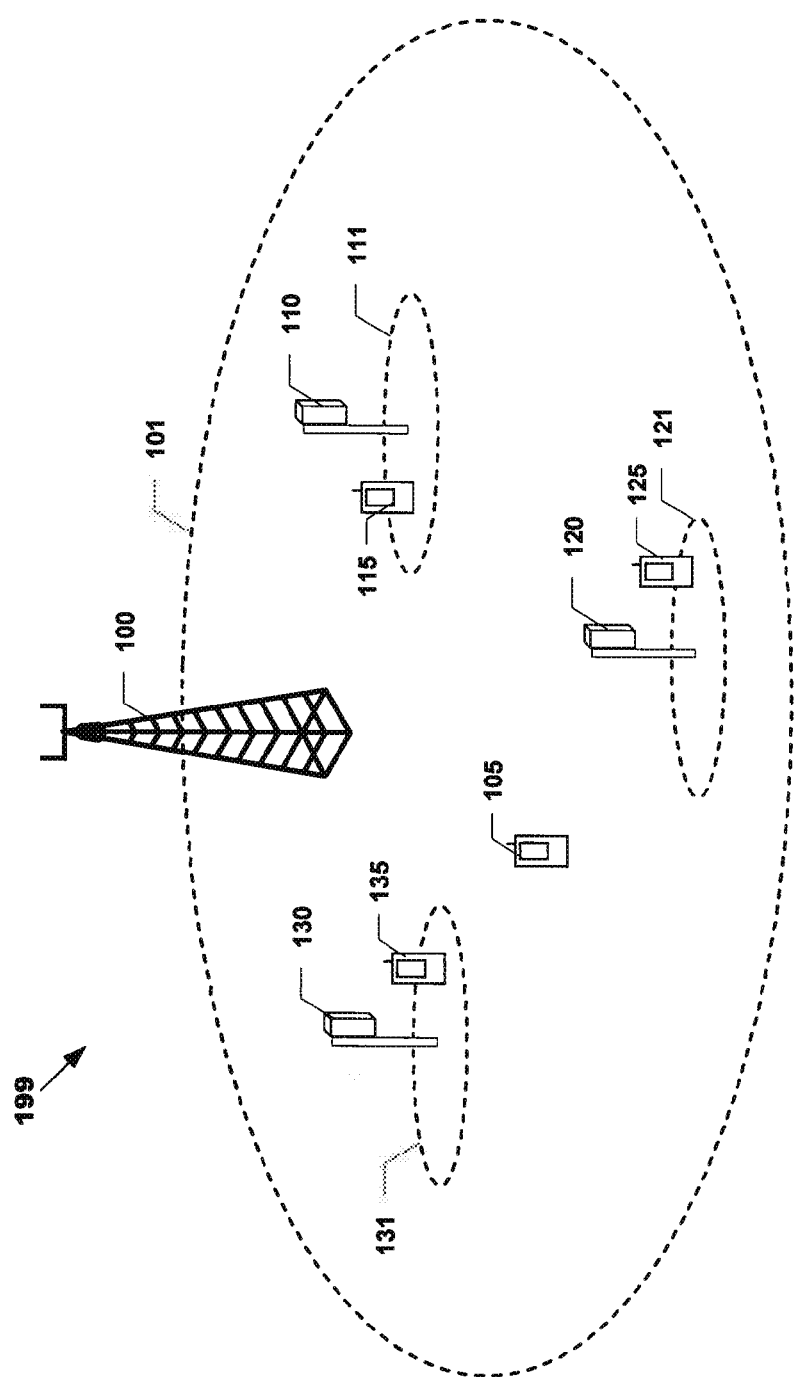
FIG. 1 illustrates an example HetNet.
Figure 2:
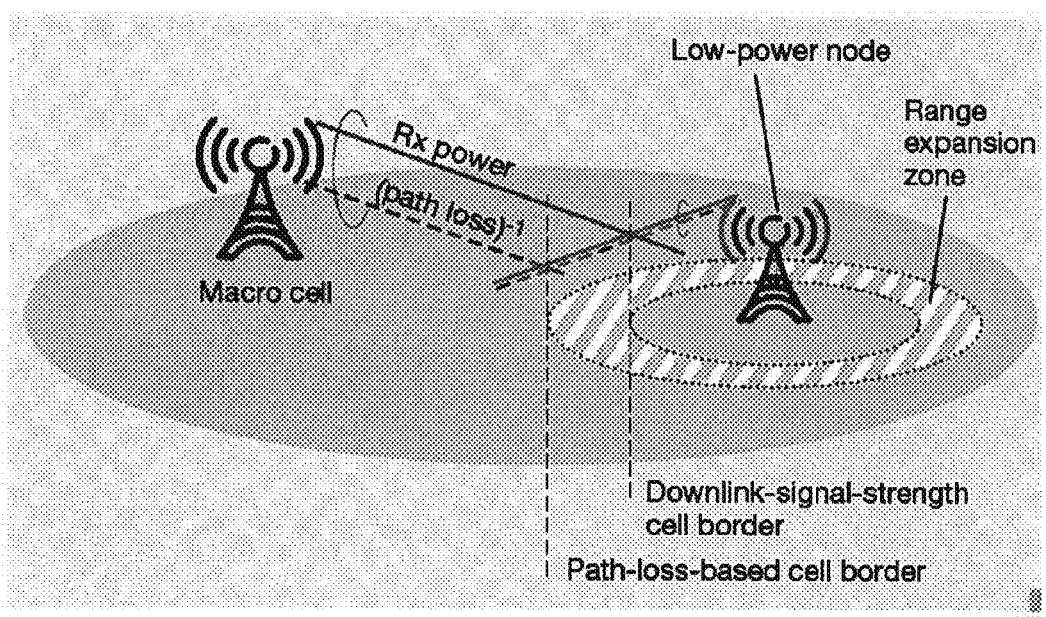
FIG. 2 illustrates a node's expansion zone.
Figure 3:
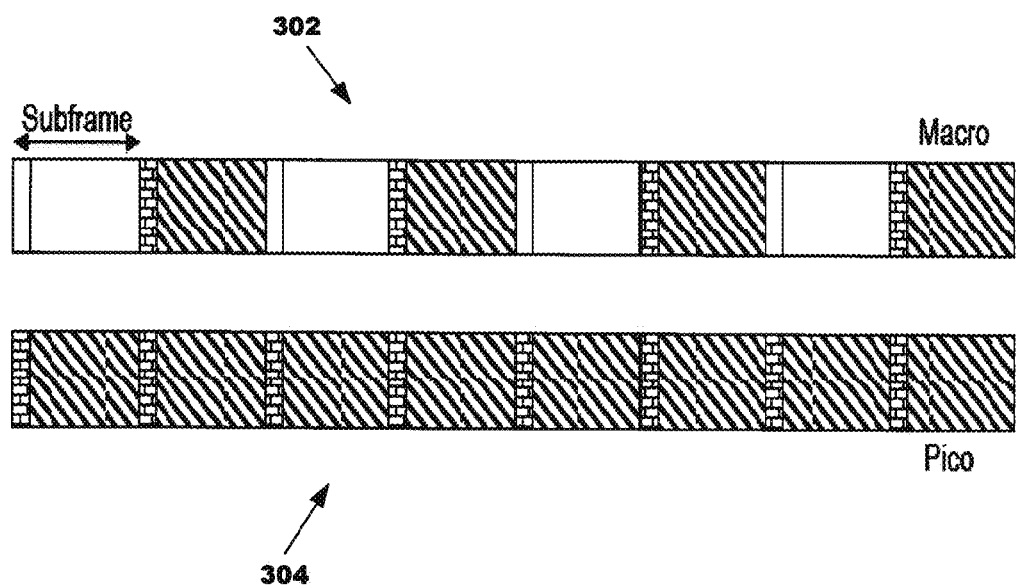
FIG. 3 illustrates an example of time-domain resource partitioning.
Figure 4A:
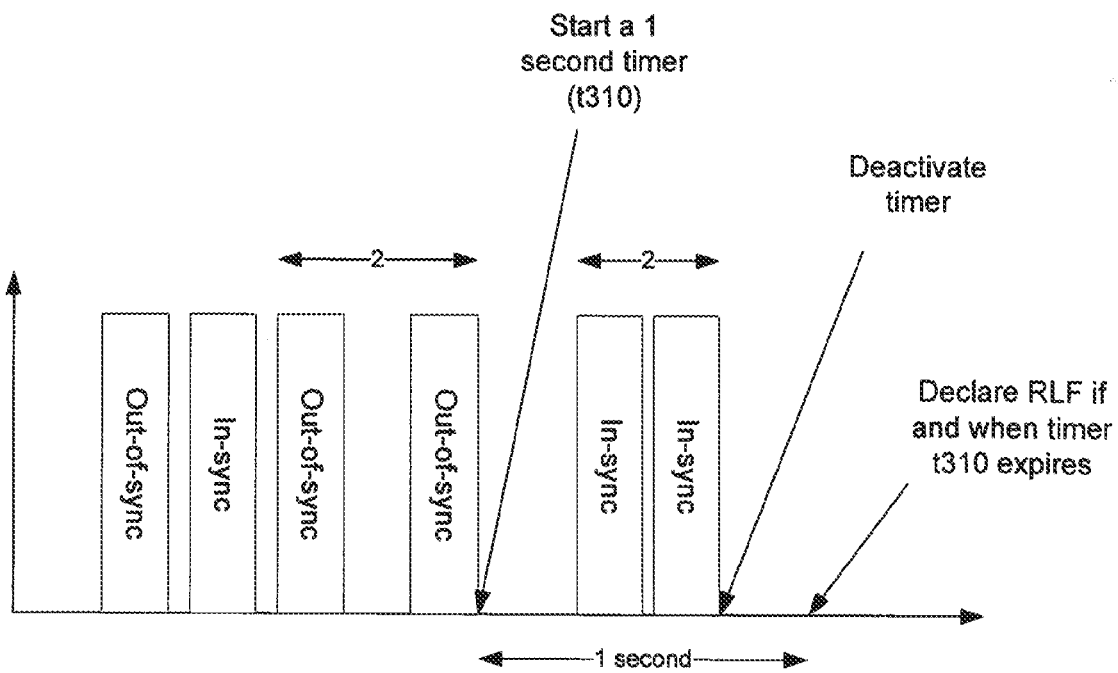
FIG. 4A illustrates an example default link failure triggering rule.

FIG. 4A is a diagram illustrating an example default link failure triggering rule used by a communication device (e.g., a User Equipment (UE) in LTE parlance), in some embodiments, for declaring an RLF (i.e., for considering radio link failure to be detected) and illustrating parameters of the rule. As shown in FIG. 4A, under the example default rule, the communication device, in response detection of a first condition (e.g., some number (n310) of consecutive out-of-sync indications being issued—in this case n310=2, but in some cases n310=1 or some other number), sets a link failure triggering timer (e.g., timer t310 in LTE parlance) to expire after some period of time has elapsed (1 second in this example). As further illustrated in FIG. 4A, the communication device stops the link failure triggering timer in response to detection of a second condition (e.g., some number (n311) of consecutive in-sync indications being issued—in this case n311=2). Under the example rule, the communication device declares an RLF if and when the link failure triggering timer (t310) expires.

Figure 5:
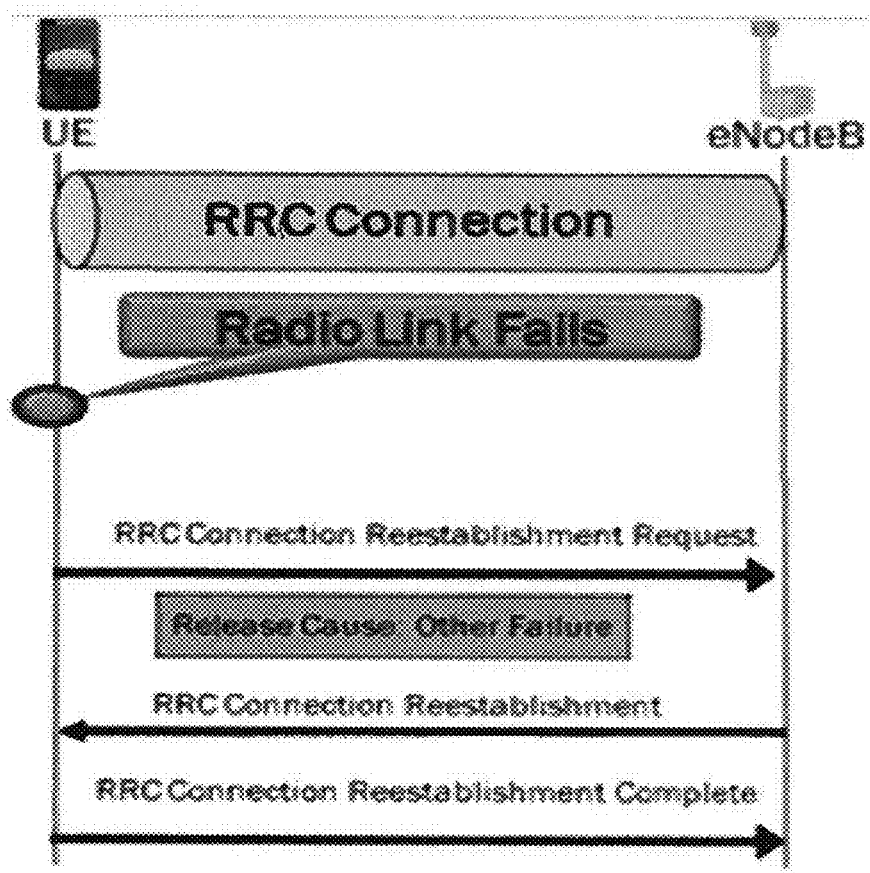
FIG. 5 illustrates a process that may occur in response to a communication device declaring an RLF.

FIG. 5 is a signaling diagram illustrating a process that may be performed in response to an RLF being declared by UE 125. As shown in FIG. 5, UE 125 may transmit a connection request (e.g., a Radio Resource Control (RRC) Connection Reestablishment Request). In response to receiving this request, a network node (e.g., node 120) transmits a connection message (e.g., an RRC Connection Reestablishment message). In response to this message, UE 125 transmits and connection complete message (e.g., an RRC Connection Reestablishment message).

Figure 6:
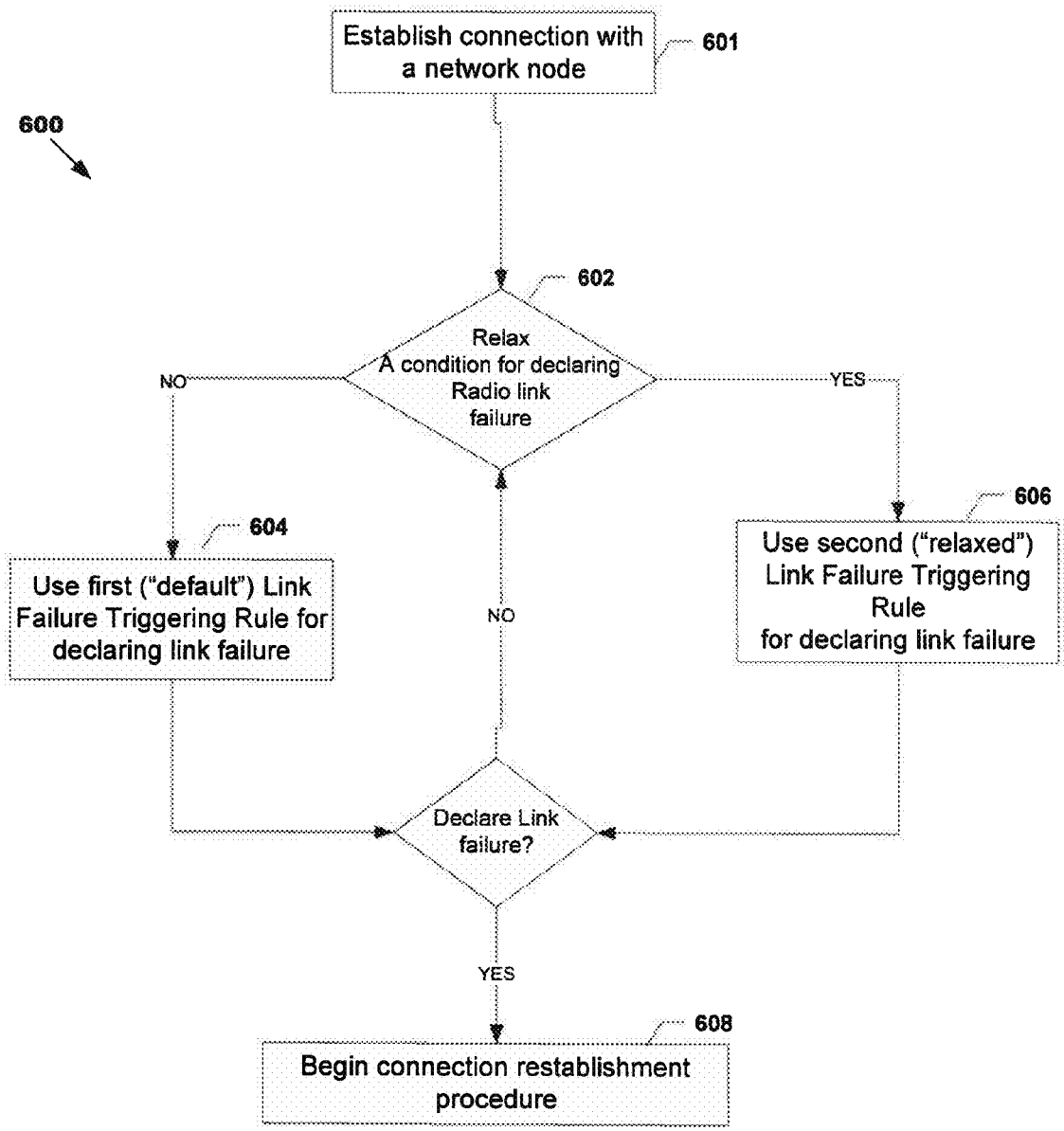
FIG. 6 is a flowchart of a method according to an exemplifying embodiment.

FIG. 6 is a flow chart illustrating a process 600, according to some embodiments, that when implemented by a communication device (hereafter "UE") may cause the UE located in an expansion zone of a serving node to declare an RLF less frequently. Process 600 may begin with the UE establishing a connection (e.g., an RRC connection) with a network node (e.g., a pico base station) (step 601). The node with which the UE establishes a connection is referred to as the serving node. In step 602, the UE determines whether it should relax a condition for declaring an RLF. If so, the process proceeds to step 606, otherwise the process proceeds to step 604. In step 604, the UE uses a first or "default" link failure triggering rule (see FIG. 4A) to determine if and when to declare an RLF, and, in step 606, the UE uses a second, relaxed link failure triggering rule (see FIG. 4B) to determine if and when to declare an RLF. If the UE declares an RLF, process 600 proceeds to step 608, otherwise it returns to step 602. In step 608, the UE begins a connection reestablishment procedure.

Figure 4B:
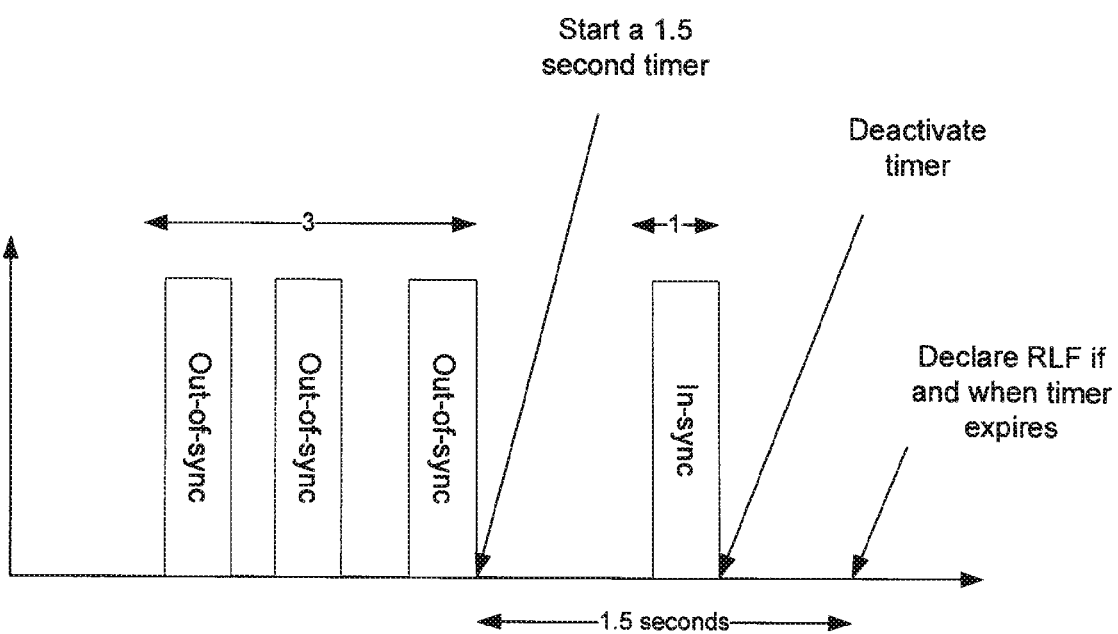
FIG. 4B illustrates an example relaxed link failure triggering rule.

Referring now to FIG. 4B, FIG. 4B illustrates a "relaxed" link failure triggering rule. The rule is a "relaxed" rule because, as compared to a default link failure triggering rule (see e.g., FIG. 4A), the relaxed rule is less stringent. For example, under the example default rule, an RLF may be declared after the issuance of only two consecutive out-of-sync indications (i.e., n310=2), whereas, under the relaxed rule illustrated in FIG. 4B, an RLF may be declared only after the issuance of more than two consecutive out-of-sync indications (i.e., n310>2). More specifically, in the example shown, the example relaxed rule specifies that the link failure triggering timer is activated only after three consecutive out-of-sync indications (i.e., n310=3).

There may be other ways in which a relaxed rule is less stringent than a default rule. For example, in the embodiment shown in FIG. 4B, the relaxed rule is also less stringent than the default rule because the link failure triggering timer is longer under the relaxed rule than under the default rule (i.e., 1.5 seconds compared with 1 second), and, moreover, under the relaxed rule the triggering timer is deactivated after a single in-sync indication, whereas under the default rule the triggering timer is deactivated only after two in-sync indications. In other embodiments, one or more additional conditions may be added to a link triggering rule to create a relaxed triggering rule. For instance, a relaxed triggering rule may specify that an RLF is declared not merely when the triggering timer expires, but only when the triggering timer expires and another condition is satisfied, such as the lower layer issuing an additional out-of-sync indication after the triggering time was started and before it expires.

Figure 7:
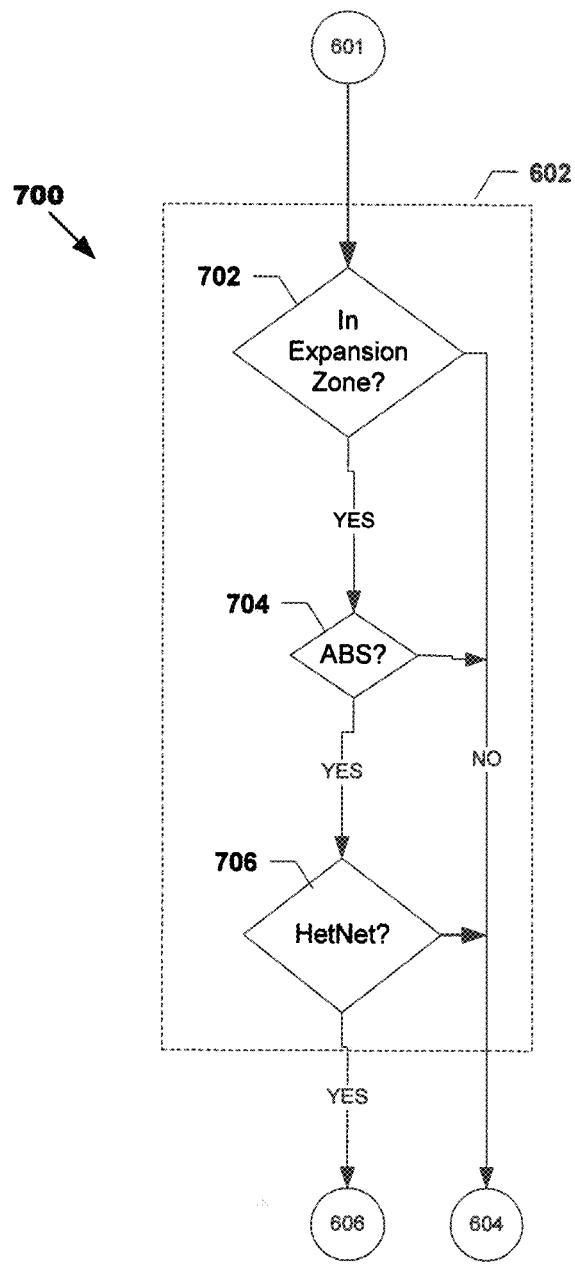
FIG. 7 is a flowchart of a method according to an exemplifying embodiment.

Referring now to FIG. 7, FIG. 7 illustrates a process 700 for implementing step 602 of process 600. Process 700 may begin in step 702, where the UE determines whether it is within an expansion zone of the serving node. If it is not, the process ends and a relaxed triggering rule will not be used, otherwise it proceeds to step 704. In step 704, the UE determines whether time-domain resource partitioning (e.g., ABSs) is implemented in network 199. More specifically, for example, in step 704 the UE may determine whether a macro node that is neighbours with the serving node occasionally (e.g., periodically) transmits ABSs. If not, the process ends and a relaxed triggering rule will not be used, otherwise the process proceeds to step 706. In step 706, the UE determines whether network 199 is a HetNet. If it is, then a relaxed triggering rule will be used, otherwise a relaxed triggering rule will not be used. While FIG. 7 illustrates that three conditions must exist in order for the UE to use a relaxed triggering rule, this was done only for the sake of illustration. That is, one or more of steps 702, 704, and 706 may be optional in some embodiments. For example, in some embodiments, steps 704 and 706 are not performed (that is, a relaxed triggering rule is used whenever the UE finds itself in the expansion zone). In other embodiments, for example, step 704 is omitted such that a relaxed triggering rule is used whenever the UE finds itself in the expansion zone and in the network is an HetNet.

A reason for performing step 704 is that, during a given transmission time interval (TTI), cell specific reference symbols (CRSs), which are used for the measurement of the radio link and hence used for the eventual triggering of radio link failure at the UE, might be heavily interfered by the transmission of data from the neighbor macro base station. At a next TTI, or in one of the next TTIs, CRSs might not be interfered from the data transmission of the closest macro BS, due to this last one (macro BS) sending an ABS. Hence, n310 can be tuned for those UEs in the extended range of small cells to be at least equal to the duty cycle of ABS pattern.

Figure 8:
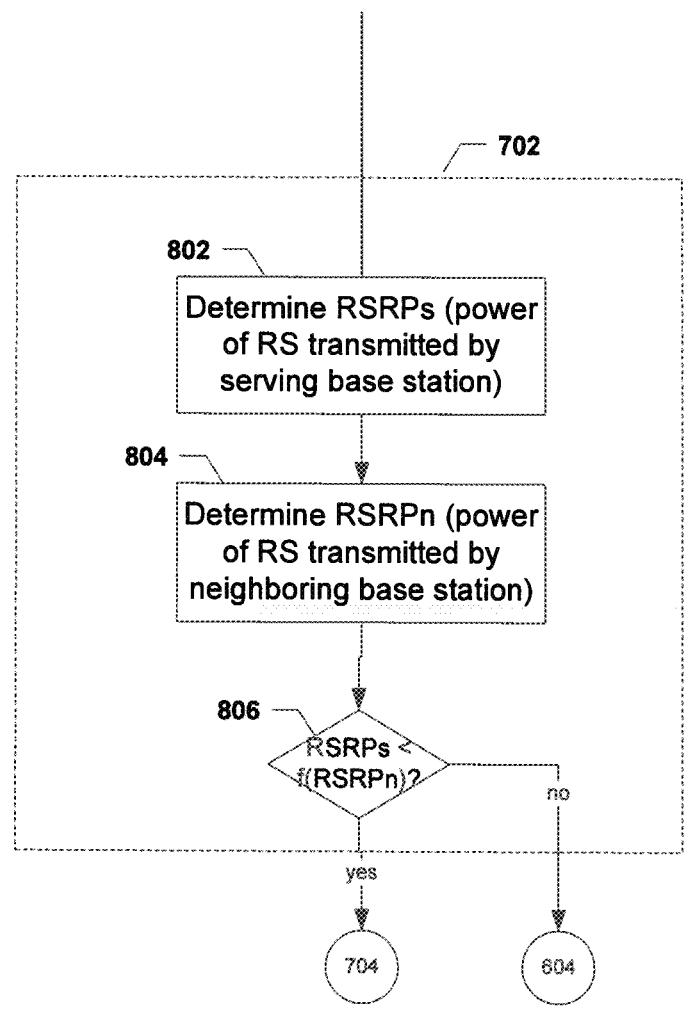
FIG. 8 is a flowchart of a method according to another exemplifying embodiment.

Referring now to FIG. 8, FIG. 8 illustrates a process 800 for implementing step 702 of process 700. Process 800 may begin in step 802, where the UE detects a reference signal (RS) transmitted from the serving base station and determines RSRPs—the power of the reference signal transmitted by the serving node. In step 804, where the UE detects a reference signal (RS) transmitted from a neighboring node and determines RSRPn—the power of the reference signal transmitted by the neighboring node. In step 806, the UE determines whether RSPSs is less than f(RSRPn). If so, then UE determines that it is within the serving nodes expansion zone. In some embodiments f(RSRPn)=RSRPn+Off, where Off is a predetermined offset. In some embodiments Off is greater than or equal to zero. In other embodiments, Off is less than zero.

Figure 9:
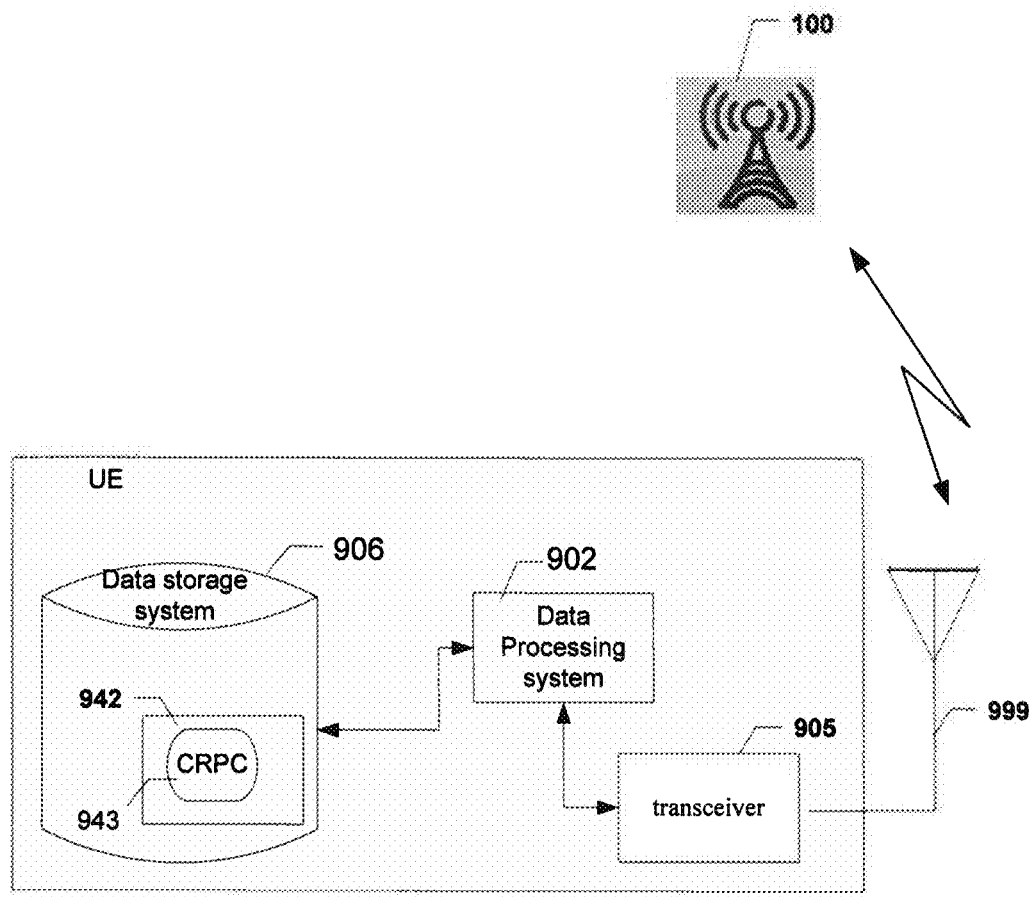
FIG. 9 is a block diagram illustrating a communication device according to an exemplifying embodiment.

Referring now to FIG. 9, FIG. 9 illustrates a block diagram of a communication device (e.g., UE 105), according to some embodiments. As shown in FIG. 9, the UE 105 may include: a data processing system 902, which may include one or more data processing devices each having one or more microprocessors and/or one or more circuits, such as an application specific integrated circuit (ASIC), Field-programmable gate arrays (FPGAs), etc.; a transceiver 905 coupled to an antenna 999 for receiving data from and transmitting data to a network node (e.g., macro node 100 or a pico node); a data storage system 906, which may include one or more computer-readable mediums, such as non-volatile storage devices and/or volatile storage devices (e.g., random access memory (RAM)).

In embodiments where data processing system 902 includes a processor (e.g., a microprocessor), a computer program product is provided, which computer program product includes: computer readable program code 943, which implements a computer program, stored on a computer readable medium 942, such as, but not limited to magnetic media (e.g., a hard disk), optical media (e.g., a DVD), memory devices (e.g., random access memory), etc. In some embodiments, computer readable program code 943 is configured such that, when executed by data processing system 902, code 943 causes the processing system 902 to perform steps described above (e.g., steps describe above with reference to the flow charts shown in FIGS. 6-8).

In other embodiments, UE 105 may be configured to perform steps described above without the need for code 943. For example, data processing system 902 may consist merely of specialized hardware, such as one or more application-specific integrated circuits (ASICs). Hence, the features of the present invention described above may be implemented in hardware and/or software. For example, in some embodiments, the functional components of UE 105 described above may be implemented by data processing system 902 executing computer instructions 943, by data processing system 902 operating independent of any computer instructions 943, or by any suitable combination of hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a communication device for declaring a radio link failure (RLF), comprising:
    establishing a connection between the communication device and a serving base station;
    determining whether to relax a condition for declaring an RLF;
    using a first rule in declaring an RLF in response to determining that the communication device should not relax the condition, wherein link failure is declared under the first rule if a first set of conditions is met, wherein a first condition in the first set of conditions is that a number of consecutive out-of-sync indications must exceed a first threshold value, and a second condition in the first set of conditions is an expiration of a timer initiated after the first condition in the first set is met; and
    using a relaxed rule in declaring an RLF in response to determining that the communication device should relax the condition, wherein, link failure is declared under the relaxed rule if a second set of conditions is met, wherein a first condition in the second set of conditions is that a number of consecutive out-of-sync indications exceeds a second threshold value, and second condition in the second set of conditions is an expiration of a timer initiated after the first condition in the second set is met,
    wherein, the second threshold value is greater than the first threshold value, and
    wherein the first threshold is equal to or greater than 1, and the second threshold is equal to or greater than 3.

2. The method of claim 1, wherein the step of determining whether to relax a condition for declaring an RLF comprises the communication device determining whether it is within an expansion zone of the serving base station.

3. The method of claim 2, wherein the step of determining whether the device is within an expansion zone of the serving base station comprises:
    detecting a first reference signal transmitted from the serving base station;
    detecting a second reference signal transmitted from a neighboring base station; and
    determining whether the received power of the first reference signal is less than a value that is a function of the received power of the second reference signal.

4. The method of claim 3, wherein the second value is equal to the received power of the second reference signal.

5. The method of claim 3, wherein the second value is equal to the received power of the second reference signal plus an offset value.

6. The method of claim 2, wherein the step of determining whether to relax a condition for declaring an RLF further comprises the communication device determining whether a base station neighboring the serving base station is configured to occasionally transmit almost blank subframes (ABS).

7. The method of claim 6, wherein the step of determining whether to relax a condition for declaring an RLF further comprises the communication device determining whether the communications network to which the device is connected is a heterogeneous network.

8. The method of claim 2, wherein the step of determining whether to relax a condition for declaring an RLF further comprises the communication device determining whether the communications network to which the device is connected is a heterogeneous network.

9. A communication device for use in a communications network, the communication device comprising:
    a processor configured to:
        determine whether to relax a condition for declaring a radio link failure (RLF) after establishing a connection with a serving base station,
        use a first rule in declaring an RLF in response to determining that a condition for declaring an RLF should not be relaxed, wherein link failure is declared under the first rule if a first set of conditions is met, wherein a first condition in the first set of conditions is that a number of consecutive out-of-sync indications must exceed a first threshold value, and a second condition in the first set of conditions is an expiration of a timer initiated after the first condition in the first set is met, and
        use a relaxed rule in declaring an RLF in response to determining that a condition for declaring an RLF should be relaxed, wherein link failure is declared under the relaxed rule if a second set of conditions is met, wherein a first condition in the second set of conditions is that a number of consecutive out-of-sync indications exceeds a second threshold value, and second condition in the second set of conditions is an expiration of a timer initiated after the first condition in the second set is met,
    wherein, the second threshold value is greater than the first threshold value, and
    wherein the first threshold is equal to or greater than 1, and the second threshold is equal to or greater than 3.

10. The communication device of claim 9, wherein the processor is further configured to determine whether to relax a condition for declaring an RLF by determining whether one or more conditions are met, the one or more conditions comprising the communication device being within an expansion zone of the serving base station.

11. The communication device of claim 10, wherein the processor is further configured to determine whether the device is within an expansion zone of the serving base station by:
    detecting a first reference signal transmitted from the serving base station;
    detecting a second reference signal transmitted from a neighboring base station; and
    determining whether the received power of the first reference signal is less than a value that is a function of the received power of the second reference signal.

12. The communication device of claim 11, wherein the second value is equal to the received power of the second reference signal.

13. The communication device of claim 11, wherein the second value is equal to the received power of the second reference signal plus an offset value.

14. The communication device of claim 9, wherein the processor is further configured to determine whether to relax a condition for declaring an RLF by:
    (a) determining whether the communication device is within an expansion zone of the serving base station and
    (b) determining whether a base station neighboring the serving base station is configured to occasionally transmit almost blank subframes (ABSs).

15. The communication device of claim 9, wherein the processor is further configured to determine whether to relax a condition for declaring an RLF by:
    (a) determining whether the communication device is within an expansion zone of the serving base station, (b) determining whether a base station neighboring the serving base station is configured to occasionally transmit almost blank subframes (ABSs), and (c) determining whether the communications network to which the device is connected is a heterogeneous network.

16. The communication device of claim 9, wherein the processor is further configured to determine whether to relax a condition for declaring an RLF by:
   (a) determining whether the communication device is within an expansion zone of the serving base station and
   (b) determining whether the communications network to which the device is connected is a heterogeneous network.

\* \* \* \* \*